United States Patent [19]

Schaffer

[11] Patent Number: 4,615,860
[45] Date of Patent: Oct. 7, 1986

[54] TOKAMAK WITH IN SITU MAGNETOHYDRODYNAMIC GENERATION OF TOROIDAL MAGNETIC FIELD

[75] Inventor: Michael J. Schaffer, San Diego, Calif.

[73] Assignee: United States Department of Energy, Washington, D.C.

[21] Appl. No.: 15,965

[22] Filed: Feb. 28, 1979

[51] Int. Cl.⁴ ............................................. G21B 1/00
[52] U.S. Cl. .................................. 376/133; 376/142; 376/146
[58] Field of Search ............................ 176/1, 3, 6–9; 376/133, 142, 146

[56] References Cited

U.S. PATENT DOCUMENTS

| | | | |
|---|---|---|---|
| 3,016,342 | 1/1962 | Kruskal et al. | 176/3 |
| 3,037,921 | 6/1962 | Tuck | 176/3 |
| 3,708,391 | 1/1973 | Christofilos | 176/7 |
| 4,000,036 | 12/1976 | Easley | 176/3 |

FOREIGN PATENT DOCUMENTS

| | | | |
|---|---|---|---|
| 2758866 | 7/1978 | Fed. Rep. of Germany | 176/3 |
| 855859 | 12/1960 | United Kingdom | 176/9 |

OTHER PUBLICATIONS

ORNL-TM3096, 5/73, Fraas, pp. 1, 10–30.
Proc. of The High Beta Workshop, 1975, by Robson et al., pp. 60–70.

*Primary Examiner*—Harvey E. Behrend
*Attorney, Agent, or Firm*—Patrick T. King; Roger S. Gaither; Judson R. Hightower

[57] ABSTRACT

A tokamak apparatus includes an electrically conductive metal pressure vessel for defining a chamber and confining liquid therein. A liner disposed within said chamber defines a toroidal space within the liner and confines gas therein. The metal vessel provides an electrically conductive path linking the toroidal space. Liquid metal is forced outwardly through the chamber outside of the toroidal space to generate electric current in the conductive path and thereby generate a toroidal magnetic field within the toroidal space. Toroidal plasma is developed within the toroidal space about the major axis thereof.

4 Claims, 6 Drawing Figures

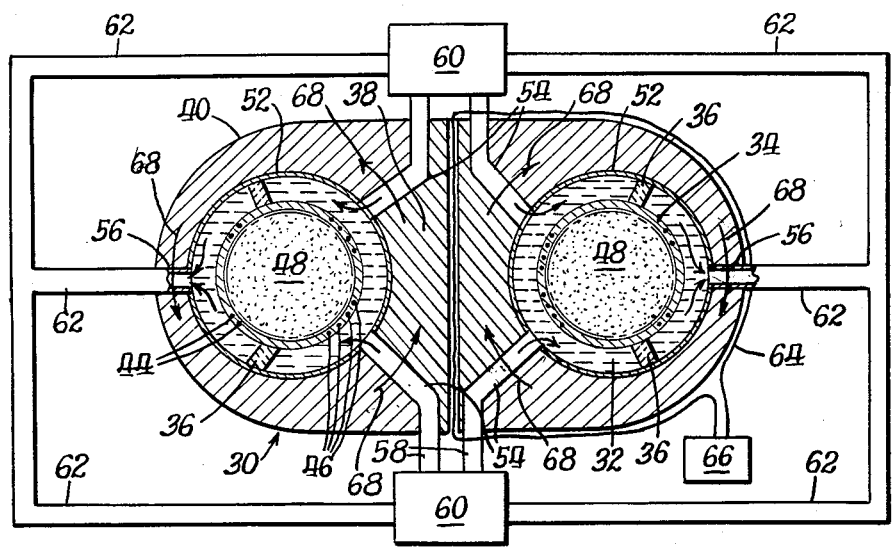
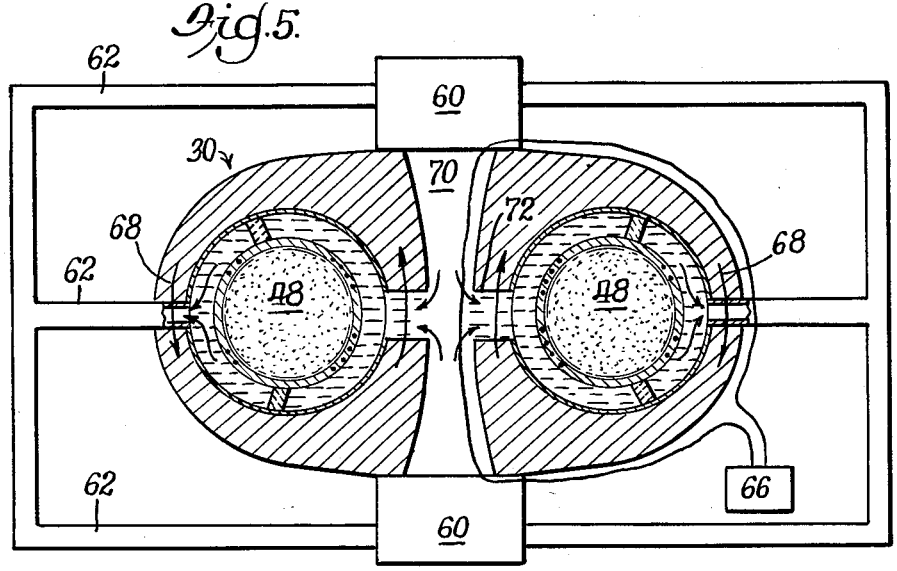
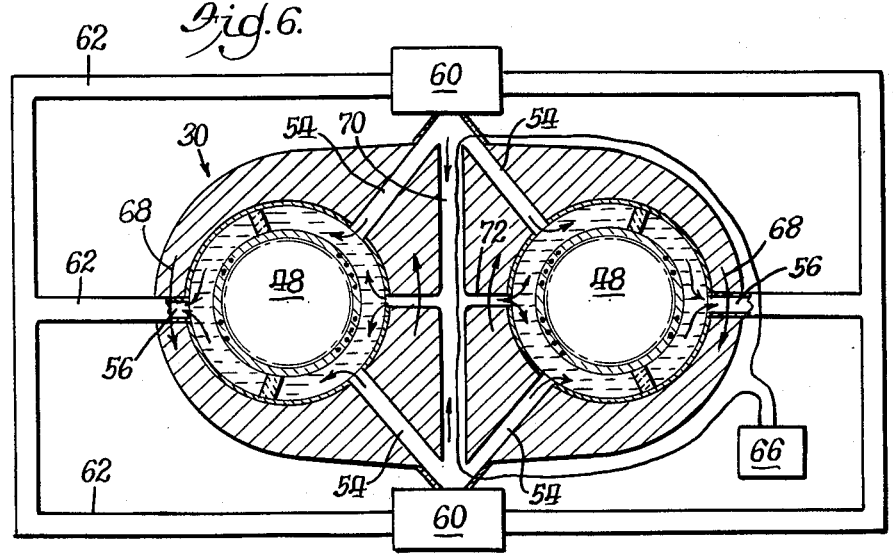

TOKAMAK WITH IN SITU MAGNETOHYDRODYNAMIC GENERATION OF TOROIDAL MAGNETIC FIELD

This invention relates generally to plasma devices, particularly such devices of the tokamak type. More particularly, the present invention relates to the generation of toroidal magnetic fields in such devices utilizing liquid metal for the in situ magnetohydrodynamic generation of toroidal magnetic fields.

Tokamak devices are devices in which plasma is created in a toroidal space and is confined therein by an appropriate combination of toroidal and poloidal magnetic fields. Such devices are useful in the study and analysis of plasmas, and particularly in the generation, confinement, study and analysis of hydrogenic plasmas. Such devices are among the most useful of known plasma devices for the reaction of deuterium and tritium with the production of high energy neutrons as reaction products. The present invention finds particular utility in respect to such devices and their applications, including experimental devices and the use thereof in experimentation and investigation in respect to toroidal plasma devices of the tokamak type.

In tokamak devices, gases are disposed in a toroidal confinement vessel. The gases are ionized to produce a plasma that is heated and confined by appropriate magnetic and electrical fields. The principal field is a toroidal magnetic field conventionally created by electrical coils linking the torus. A serious difficulty with such coils, particularly where high fields are created in a small space, has been occasioned by the very great mechanical forces and stresses created in the coils and their supports. In accordance with the present invention, the toroidal field coil is formed of a single turn in the form of a pressure vessel in which current is generated magnetohydrodynamically by liquid metal. The pressure vessel contains the liquid metal and isolates the metal mechanically from the outside environment. The toroidal confinement vessel is disposed in the liquid metal to form a toroidal bubble of gas in the liquid metal. The liquid metal is forced to flow outwardly through the pressure vessel, creating electrical current in the confinement vessel that produces the toroidal magnetic field.

Thus, a primary object of the present invention is to provide a tokamak apparatus including a pressure vessel containing a reservoir of liquid metal wherein the movement of the liquid through the pressure vessel generates electrical current therein to produce a toroidal magnetic field through toroidal plasma.

Other objects and advantages of the invention will become apparent from the following detailed description, particularly when taken in conjunction with the accompanying drawings in which:

FIG. 4 is an illustration, partly diagrammatic and partly in axial section, of a tokamak device utilizing the present invention for producing the toroidal magnetic field;

FIG. 5 is an illustration, partly diagrammatic and partly in axial section, of a tokamak device utilizing an alternative form of the present invention for producing the toroidal magnetic field; and FIG. 6 is an illustration, partly diagrammatic and partly in axial section, of a tokamak device utilizing another alternative form of the present invention for producing the toroidal magnetic field.

One of the more difficult aspects of high temperature plasma devices is the confinement of the plasma, which is ionized gas. This can be accomplished by the now well-known tokamak device. It has a toroidal containment vessel for containing the gas and the plasma. Twisting magnetic fields are created within the toroidal vessel to confine the plasma and keep it from striking the walls of the toroidal vessel. These fields include toroidal and poloidal components as produced by the flow of electric current. The manner of creating such fields is illustrated conceptually in FIGS. 1 and 2, and a generalized and simplified form of tokamak device is illustrated in FIG. 3.

Figure 1:
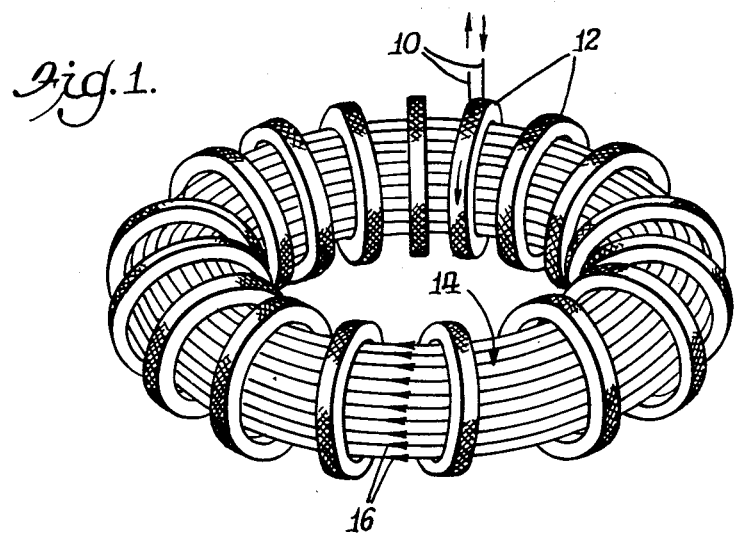
FIG. 1 is a stylized illustration of the manner of producing a toroidal magnetic field in a tokamak device.

In FIG. 1 is illustrated the means for producing the toroidal magnetic field component. Electrical current is applied over conductors 10 to toroidal field coils 12. The current in these coils links a toroidal space 14 and hence generates a toroidal magnetic field 16 therein, as indicated by the arrows.

Figure 2:
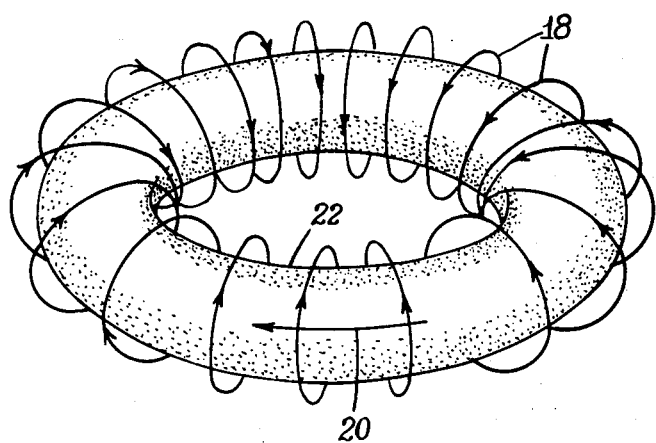
FIG. 2 is a stylized illustration of the manner of producing a poloidal magnetic field in a tokamak device.

In FIG. 2 is illustrated the means for producing the principal poloidal magnetic field component that is necessary for stable confinement. In this device, the poloidal field 18, as indicated by the arrows, is induced by toroidal current 20 in the plasma 22. In practice electric current in equilibrium field coils outside the torus generates an additional poloidal magnetic field which modifies the principal poloidal field to control the position of the plasma.

Figure 3:
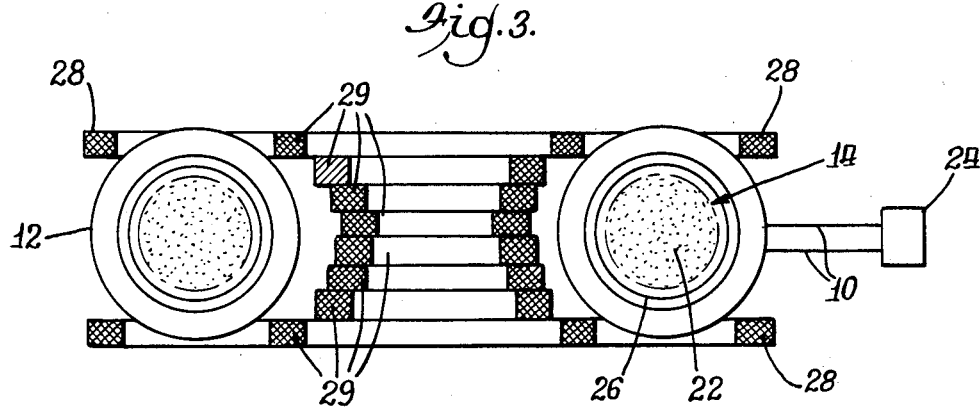
FIG. 3 is a stylized illustration of a conventional tokamak device.

As generalized, a conventional tokamak device, as illustrated in FIG. 3, combines the features of FIGS. 1 and 2 to provide a high level of plasma stability. As there illustrated, current from a power source 24 is applied over the conductors 10 to the toroidal field coils 12 which are disposed around a toroidal liner 26 which contains and defines the toroidal space 14 in which the plasma 22 is created. Equilibrium field coils 28 are supplied with electrical current from a source not illustrated to position the plasma 22 within the liner 26. Ohmic heating coils 29, also supplied with electrical current from a source not illustrated, induce current in the plasma 22 to ionize the gas, heat the plasma, and generate the poloidal magnetic field illustrated in FIG. 2.

In FIG. 4 is illustrated a preferred form of the invention for producing the toroidal magnetic field. It is thus a form of the device shown in stylized form in FIG. 1. In this preferred embodiment of the present invention, a pressure vessel 30 forms a reservoir filled with liquid metal 32. A toroidal liner 34 is supported within the liquid metal 32 by struts 36 extending to the vessel 30. The pressure vessel 30 is formed of electrically conductive material, such as a copper and stainless steel laminate, capable of withstanding relatively high internal pressure. While various other metals are effective for certain purposes, liquid lithium is preferred for the liquid metal 32, particularly for deuterium-tritium plasma devices, for lithium is suitable for moderating resultant neutrons and acts to breed tritium fuel by reaction with the neutrons:

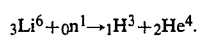

The liquid metal may also act as a coolant. The toroidal liner 34 is preferably formed of electrically insulating material and may have equilibrium field coils 44 and ohmic heating coils 46 embedded therein to provide an appropriate poloidal magnetic field and appropriate ohmic heating in the usual fashion. Alternatively these coils 44 and 46 may be supported in the liquid metal 32.

The toroidal liner 34 defines a toroidal space 48 in which gas is confined for producing plasma. The liner 34 separates the liquid metal 32 from the toroidal space 48. The ohmic heating coils 46 are energized in a conventional manner to ionize the gas and produce the plasma. The plasma is positioned by the action of the poloidal magnetic field and is confined by a toroidal field produced by current generated by passing the liquid metal 32 radially through the vessel 30.

The pressure vessel 30 is, as shown in FIG. 4, formed of a central post 38 and a pressure wall 40. The post 38 may be formed of a conductor, such as copper, and the pressure wall 40 of copper-steel laminate. The pressure vessel 30 is insulated on its interior from the liquid metal 32 by an electrical insulator coating 52. The vessel 30 is provided with two annular inlet ports 54 relatively near the major axis of the toroidal space and outlet ports 56 disposed equatorially around the outer extremity of the vessel. The liquid metal 32 is supplied to the inlet ports 54 through conduits 58 from pressured supply sources 60, which may be driven pneumatically, hydraulically, or mechanically. Liquid metal 32 passing from the outlet ports 56 is returned to the supply sources 60 through return conduits 62.

In the embodiment illustrated, the toroidal field coil consists of the pressure vessel 30, and more particularly, the post 38 and pressure wall 40 thereof, acting as a single turn coil. This coil is energized by the flow of liquid metal through the vessel 30 acting as a self-excited magnetohydrodynamic generator. That is, the flow of current develops a toroidal magnetic field which interacts with the moving liquid in the inlet ports 54 to produce an electromotive force (E.M.F.) which drives the current through the coil. In order to start this process, a small exciter coil 64 may be placed around the minor axis of the toroidal space 48. The exciter coil is energized by a power supply 66 to generate a weak magnetic field in the desired direction (into the right hand side of the toroidal space 48 as shown in FIG. 4). Liquid metal 32 is forced into the inlet ports 54 and thence around the space between the toroidal liner 34 and the pressure vessel 30, exiting through the multiple outlet ports 56 at the equator of the vessel.

The forcing of liquid metal to flow in a magnetic field constitutes a magnetohydrodynamic generator that produces current circumferentially around the minor axis of the toroidal space 48, as illustrated by the arrows 68 in FIG. 4. This current produces the desired toroidal field in the same direction as the field produced by the exciter coil 64. This toroidal field creates substantial magnetic pressure at the inlet ports, for example, of the order of 1000 atmospheres for a high field tokamak device. It is the nature of a toroidal field that its strength varies inversely of the major radius. That is, the magnetic field is greater nearer the major axis. Hence, the magnetic field is greater at the inlet ports than at the outlet ports. The magnetic pressure drop varies as the square of the magnetic field. Hence, the pressure drop is much greater at the inlet ports. Since, with an incompressible fluid, the flow into the pressure vessel 30 must be the same as the flow out, substantially more electrical power is generated at the inlet ports than is lost at the outlet ports where the magnetohydrodynamic E.M.F. is generated in the opposite direction. Hence, there is net flow of current in the direction generating the appropriate toroidal magnetic field. The toroidal magnetic field strength grows until its magnetic pressure just balances the inlet pressure, which thereby provides the means for controlling the toroidal field. With a magnetic pressure of about 1000 atmospheres, the necessary power can be generated at flows of only about 10 cubic meters per second. Desirably, the liquid metal should begin entering the toroidal field as near as possible to the major axis to minimize entrance eddy currents.

In operation of the tokamak system of the present invention, plasma is created in the toroidal space 48 by introducing appropriate gas filling therein and applying current in a known manner to the ohmic heating coils 46. This may be in a known back-bias to zero mode in order to further reduce eddy current power losses. The plasma may then be maintained in position in a known manner by applying appropriate current to the equilibrium field coils 48.

In FIG. 5 is illustrated an embodiment of the invention that has no separate center post 38. Rather, the liquid metal enters through a central passage 70 and a single central inlet port 72.

In FIG. 6 is illustrated a form of the invention combining the embodiments of FIGS. 4 and 5.

While preferred embodiments of the invention have been shown and described, various modifications may be made therein within the scope of the invention. For example, the containment vessel 30 may take other shapes, and the ports may be arranged differently. The ohmic heating coils 46 and the equilibrium coils 44 may be disposed differently and may be driven in a number of known ways. It should also be noted that details of well-known components of tokamak devices have been omitted from the drawings in order that the essential parts of the invention may be more easily shown and understood.

I claim:

1. Tokamak apparatus comprising
   an electrically conductive metal pressure vessel rotationally symmetric about a major axis and symmetric about a midplane perpendicular to that axis, said vessel having walls for defining a toroidal chamber and confining liquid therein;
   a toroidal liner symmetrically disposed within said toroidal chamber and spaced from said vessel walls for defining a toroidal space within said liner and confining gas therein, said metal vessel providing an electrically conductive path poloidally linking said toroidal space,
   gas contained in said toroidal space,
   liquid metal completely surrounding said toroidal liner and filling said chamber outside said liner, said vessel having inlet and outlet port means through which liquid metal may respectively enter and leave said chamber outside said liner, said inlet and outlet port means being relatively disposed with the latter father from the major axis of said toroidal space than the former,
   means within said chamber for insulating said pressure vessel from said liquid metal contained therein,
   exciter means for initially establishing an exciter magnetic field within said vessel in a given toroidal direction, means external to said vessel for forcing liquid metal into said chamber through said inlet port means, outwardly through said chamber outside of said toroidal liner, and out of said chamber through said outlet port means to generate poloidal electric current in said conductive path and thereby generate a toroidal magnetic field within said toroidal space in the given toroidal direction, and means for developing toroidal plasma within said toroidal space about the major axis thereof.

2. Apparatus according to claim 1 wherein said liquid metal is lithium.

3. Apparatus according to claim 1 wherein said means for developing a toroidal plasma includes ohmic heating coils carried by said toroidal liner.

4. Apparatus according to claim 3 further including equilibrium field coils carried by said toroidal liner for positioning said toroidal plasma.

* * * * *